(12) United States Patent
Sarawate et al.

(10) Patent No.: US 10,683,769 B2
(45) Date of Patent: Jun. 16, 2020

(54) CENTRIFUGALLY ACTIVATABLE SEAL FOR A ROTARY MACHINE AND METHOD OF ASSEMBLING SAME

(71) Applicant: General Electric Company, Schenectady, NY (US)

(72) Inventors: Neelesh Nandkumar Sarawate, Niskayuna, NY (US); Deepak Trivedi, Schenectady, NY (US); Xiaoqing Zheng, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 446 days.

(21) Appl. No.: 15/248,161

(22) Filed: Aug. 26, 2016

(65) Prior Publication Data

US 2018/0058241 A1  Mar. 1, 2018

(51) Int. Cl.
*F01D 11/08* (2006.01)
*F01D 11/00* (2006.01)
(Continued)

(52) U.S. Cl.
CPC ............ *F01D 11/08* (2013.01); *F01D 5/02* (2013.01); *F01D 9/02* (2013.01); *F01D 11/001* (2013.01);
(Continued)

(58) Field of Classification Search
CPC ..... F01D 11/001; F01D 11/025; F16J 15/164; F16J 15/3288; F05D 2240/56
See application file for complete search history.

(56) References Cited

U.S. PATENT DOCUMENTS

| | | | |
|---|---|---|---|
| 2,314,289 A | 3/1943 | Salisbury | |
| 2,854,927 A | 10/1958 | Berg | |

(Continued)

FOREIGN PATENT DOCUMENTS

| | | | | |
|---|---|---|---|---|
| EP | 2 339 124 A1 | 6/2011 | | |
| EP | 2339124 A1 | * | 6/2011 | ............ F01D 11/001 |
| EP | 3 220 017 A1 | 9/2017 | | |

OTHER PUBLICATIONS

Grondahl, "Pressure Actuated Leaf Seals for Improved Turbine Shaft Sealing", AIAA 2005-3985, AIAA Joint Propulsion, pp. 1-10, Jul. 10-13, 2005.

(Continued)

*Primary Examiner* — Moshe Wilensky
*Assistant Examiner* — Andrew Thanh Bui
(74) *Attorney, Agent, or Firm* — Ann Agosti

(57) ABSTRACT

A seal for a rotary machine includes a flexible element extending circumferentially about a rotating component and extending generally radially from a first end to a free second end. The flexible element is coupled proximate the first end for rotation with the rotating component. The seal also includes a retaining plate having a stop face that orients the flexible element at a first angle when the rotating component is operating at less than a critical speed and under the including of pressure loading, such that a clearance gap is defined between the free second end and a stationary component. The flexible element extends at substantially a second angle when the rotating component is operating at a speed greater than the critical speed, such that the flexible element forms a dynamic seal between the rotating component and the stationary component.

19 Claims, 3 Drawing Sheets

(51) Int. Cl.
*F01D 11/02* (2006.01)
*F16J 15/3292* (2016.01)
*F16J 15/3288* (2016.01)
*F16J 15/16* (2006.01)
*F01D 5/02* (2006.01)
*F01D 9/02* (2006.01)

(52) U.S. Cl.
CPC ......... *F01D 11/025* (2013.01); *F16J 15/164* (2013.01); *F16J 15/3288* (2013.01); *F16J 15/3292* (2013.01); *F05D 2220/31* (2013.01); *F05D 2230/60* (2013.01); *F05D 2240/56* (2013.01); *F05D 2260/30* (2013.01)

(56) References Cited

U.S. PATENT DOCUMENTS

| | | | |
|---|---|---|---|
| 3,743,303 | A | 7/1973 | Pope |
| 4,714,258 | A | 12/1987 | Sauron et al. |
| 4,972,986 | A | 11/1990 | Lipschitz |
| 5,042,823 | A * | 8/1991 | Mackay ................. F01D 11/02 277/355 |
| 6,644,667 | B2 | 11/2003 | Grondahl |
| 7,578,509 | B2 | 8/2009 | Grondahl |
| 8,235,392 | B2 * | 8/2012 | Gail ........................ F01D 11/00 277/355 |
| 8,430,628 | B2 | 4/2013 | Turnquist et al. |
| 8,474,827 | B2 | 7/2013 | Grondahl et al. |
| 8,596,973 | B2 | 12/2013 | Grondahl |
| 9,121,297 | B2 | 9/2015 | Zheng et al. |
| 2006/0091612 | A1 | 5/2006 | Anderberg |
| 2009/0212501 | A1 | 8/2009 | Glahn et al. |
| 2012/0251290 | A1 * | 10/2012 | Turnquist ............. F01D 11/001 415/1 |
| 2012/0288361 | A1 * | 11/2012 | Lu ......................... F01D 11/001 415/174.2 |
| 2018/0223995 | A1 * | 8/2018 | Kloetzer ............... F16J 15/3288 |

OTHER PUBLICATIONS

Grondahl et al., "Film Riding Leaf Seals Improved Shaft Sealing", GT2010-23629, Proceedings of ASME Turbo Expo 2010, pp. 1-8, Jun. 14-18, 2010.

Chupp et al., "Turbine Aerodynamics, Heat Transfer, Materials, and Mechanics", Progress in Astronautics and Aeronautics, AIAA, vol. 243, pp. 61-188, 2014.

Bowsher et al., "Pressure Activated Leaf Seal Technology Readiness Testing", GT2014-27046, Proceedings of ASME Turbo Expo 2014, pp. 1-13, Jun. 16-20, 2014.

Langston, "PALS—An Auspicious New Gas Turbine Seal", Global Gas turbine News, pp. 54-55, Mar. 2016.

Zheng, Xiaoqing, et al., "Centrifugally Activatable Seal for a Rotary Machine and Method of Assembling Same"; Pending U.S. Appl. No. 14/869,538, filed Nov. 5, 2014; 23 Pages.

International Search Report and Written Opinion issued in connection with corresponding PCT Application No. PCT/US2017/45659 dated Nov. 15, 2017.

* cited by examiner

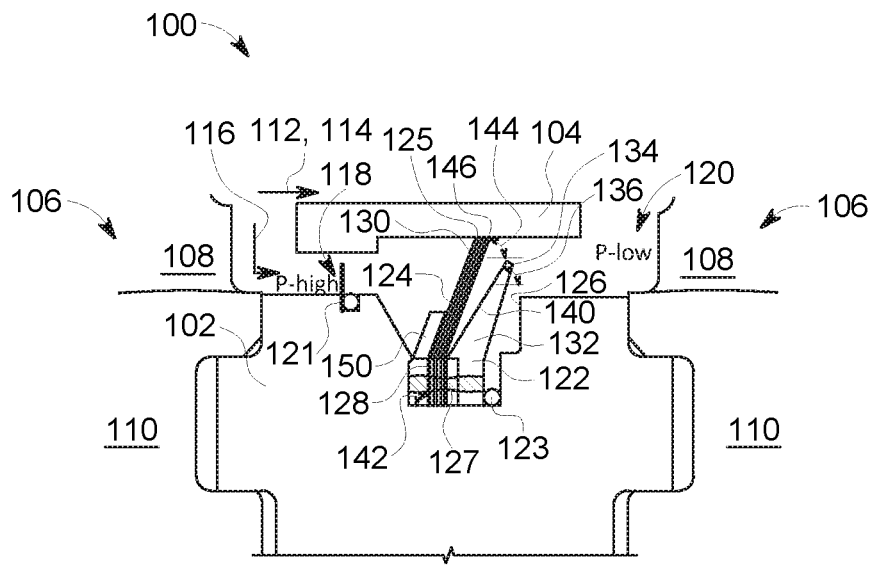

Coupling a flexible component to a rotating component proximate a first end of the flexible element, the flexible element configured to extend at an angle when the rotating component operates equal to or greater than critical speed, such that the flexible element forms a dynamic seal between the rotating component and the stationary component ~202

Coupling a retaining plate adjacent the flexible element, the retaining plate including a stop face configured to orient the flexible element at an angle proximate the retaining plate when the rotating component operates at a speed less than the critical speed and under the influence of pressure loading such that a clearance gap is defined between the flexible element and the stationary component ~204

FIG. 5

CENTRIFUGALLY ACTIVATABLE SEAL FOR A ROTARY MACHINE AND METHOD OF ASSEMBLING SAME

BACKGROUND

The field of the disclosure relates generally to seals for rotary machines, and, more particularly, to a centrifugally activatable seal for a rotary machine.

At least some known rotary machines, including, but not limited to, some known steam turbines, include a seal configured to prevent leakage of a working fluid through gaps between stationary and rotating components. At least some such known seals are configured to provide a clearance between the stationary and rotating components. For at least some such known seals, the clearance is selected to be sufficiently wide to reduce a breakaway torque required to start the rotary machine, and/or to limit an interference with axial movement of the rotating components relative to the stationary components. However, in at least some cases, increasing the width of the clearance to meet such requirements results in a corresponding increase in a residual leakage through the seal.

In one such rotating seal, a bristle pack is arranged so that when the rotating component rotates, the centrifugal force due to rotation pushes the bristles against a backing plate. Furthermore, the pressure differential across the seal also pushes the bristle pack against the backing plate. This makes the bristle pack significantly stiff. When the seal is stiff, it exerts larger normal load against the adjacent stationary component. With larger than normal loads, frictional force as well as rate of wear also increase.

Thus, it is highly desirable to provide a seal for a rotary machine that addresses one or more of the issues described above.

BRIEF DESCRIPTION

These and other shortcomings of the prior art are addressed by the present disclosure, which includes a seal for a rotary machine.

Briefly, one aspect of the present disclosure resides in a seal for a rotary machine. The seal includes a flexible element and a retaining plate. The flexible element extends circumferentially about a rotating component of the rotary machine and generally radially from a first end to an opposite, free second end. The flexible element is configured for coupling proximate the first end for rotation with the rotating component. The retaining plate is configured for coupling adjacent the flexible element for rotation with the rotating component. The retaining plate comprises a stop face configured to orient the flexible element at a first angle when the rotating component is operating at less than a critical speed and under the influence of pressure loading, such that a clearance gap is defined between the flexible element and a stationary component of the rotary machine. The flexible element faces a high-pressure side of the seal, and the retaining plate is exposed to a downstream, low-pressure side of the seal. The flexible element is configured to extend at substantially a second angle when the rotating component is operating at a speed greater than the critical speed, such that a dynamic seal is defined between the rotating component and the stationary component of the rotary machine.

Another aspect of the disclosure resides in a rotary machine. The rotary machine includes a rotating component, a stationary component, a flexible element and a retaining plate. The stationary component extends circumferentially about the rotating component. The flexible element extends circumferentially about the rotating component of the rotary machine and generally radially from a first end to an opposite, free second end. The flexible elements configured for coupling proximate the first end for rotation with the rotating component. The retaining plate is configured for coupling adjacent the flexible element for rotation with the rotating component. The retaining plate comprises a stop face configured to orient the flexible element at a first angle when the rotating component is operating at less than a critical speed and under the influence of pressure loading, such that a clearance gap is defined between the flexible element and a stationary component of the rotary machine. The flexible element is configured to extend at substantially a second angle when the rotating component is operating at a speed greater than the critical speed, such that a dynamic seal is defined between the rotating component and the stationary component of the rotary machine.

Yet another aspect of the disclosure resides in a method for assembling a seal of a rotary machine is provided. The method includes coupling a flexible component to a rotating component proximate a first end of the flexible element and coupling a retaining plate adjacent the flexible element. The flexible element is configured to extend at an angle when the rotating component operates greater than a critical speed, such that the flexible element forms a dynamic seal between the rotating component and the stationary component. The retaining plate includes a stop face configured to orient the flexible element at an angle proximate the retaining plate when the rotating component is operating at speed at less than the critical speed and under the influence of pressure loading such that a clearance gap is defined between the flexible element and the stationary component.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 is a schematic sectional view of another exemplary embodiment of a pressure activatable seal in a second operating state coupled to the exemplary rotary machine shown in FIG. 1, in accordance with one or more embodiments shown or described herein; and FIG. 5 is a flow diagram of an exemplary method of assembling a seal, such as the exemplary seal shown in any of FIGS. 2-4, of a rotary machine, such as the exemplary rotary machine shown in FIG. 1, in accordance with one or more embodiments shown or described herein.

DETAILED DESCRIPTION

Figure 1:
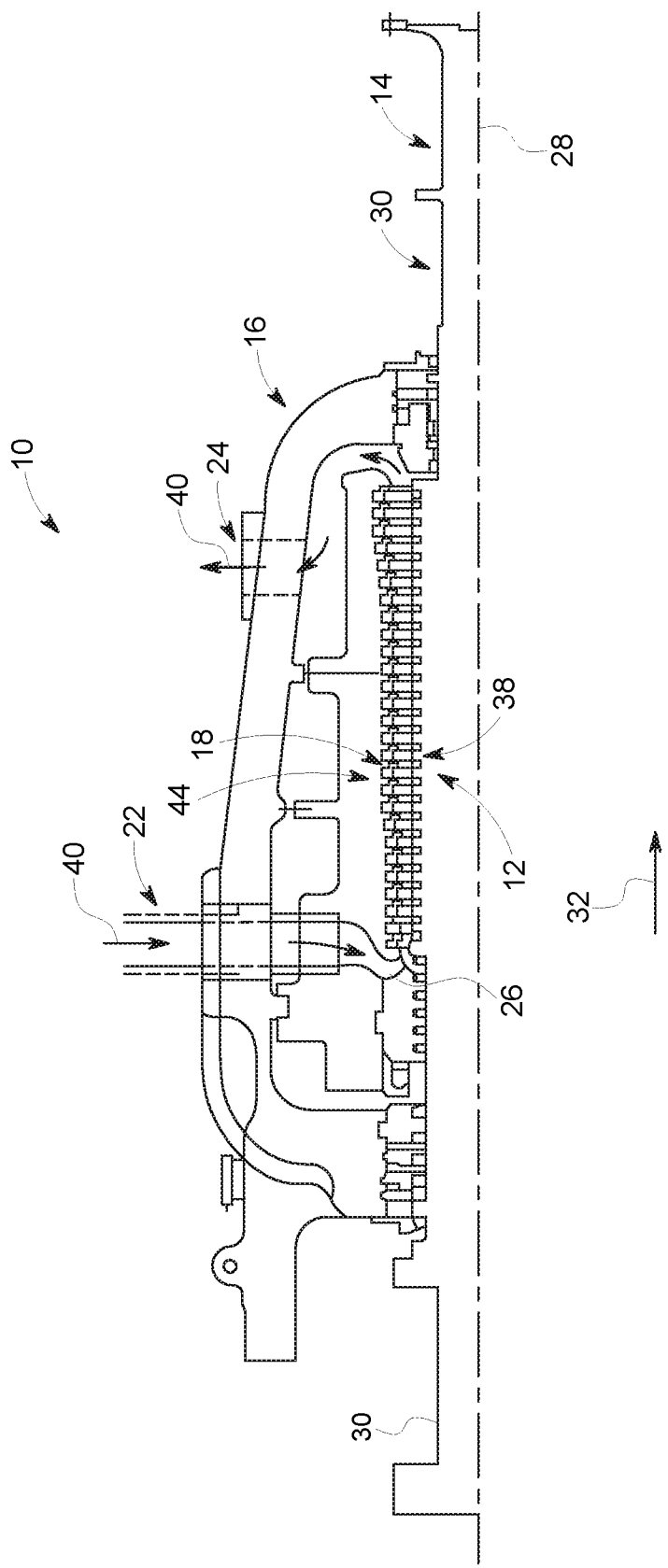
FIG. 1 is a schematic view of an exemplary rotary machine, in accordance with one or more embodiments shown or described herein.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The embodiments described herein provide a seal that includes a flexible element and a retaining plate coupled to a rotating component. More specifically, a stop face on the retaining plate is configured to hold the flexible element at a first angle when the rotating component operates below a critical speed and in response to pressure loading, thereby providing a clearance gap between the flexible element and a stationary component of the rotary machine. Additionally, the flexible element is configured to extend away from the retaining plate at a second angle when the rotating component operates at or above the critical speed in response to centrifugal loading, such that a dynamic seal is formed by the flexible element and the stationary component. As used herein, the term "critical speed" is defined as the rotational speed at which the stiffness of the flexible element is overcome by the centrifugal force induced by the rotation of the rotating component about the centerline axis, causing the angle at which second end extends to increase beyond the first angle.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations are identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

FIG. 1 is a schematic view of an exemplary rotary machine 10. In the exemplary embodiment, the rotary machine 10 is a single-flow steam turbine. In alternative embodiments, the rotary machine 10 is an opposed-flow steam turbine. In other alternative embodiments, the rotary machine 10 is any other suitable rotary machine system, such as a gas turbine.

In the exemplary embodiment, the rotary machine 10 includes a plurality of turbine stages 12. Each of the plurality of turbine stages 12 includes a plurality of circumferentially disposed rotor blades 38 coupled to rotating component, and more particularly a rotor, 14. It should be noted that, as used herein, the term "couple" is not limited to a direct mechanical, electrical, and/or communication connection between components, but may also include an indirect mechanical, electrical, and/or communication connection between multiple components. The rotor blades 38 extend radially outward from the rotating component 14. The plurality of rotor blades 38 include any suitable number of rotor blades 38 that enables the rotary machine 10 to operate as described herein. The rotating component 14 is supported at opposing end portions 30 of the rotating component 14 by bearings (not shown).

A casing 16 surrounds the plurality of turbine stages 12. A plurality of diaphragms 18 is coupled to the casing 16, such that a respective diaphragm 18 is positioned upstream of each of the plurality of turbine stages 12. Each of the plurality of diaphragms 18 includes a plurality of circumferentially disposed partitions 44. Each of the plurality of circumferentially disposed partitions 44 are generally airfoil shaped and extend radially inward from the casing 16.

The rotary machine 10 includes a high pressure steam inlet 22 and a low pressure steam exhaust 24. The rotating component 14 is rotatable about a centerline axis 28. During operation, the high-pressure and high-temperature steam 40 is channeled from a steam source, such as a boiler or the like (not shown), through the HP steam inlet 22 into an inlet 26. From the inlet 26, the steam 40 is channeled in a downstream direction 32 through the casing 16, where it encounters the plurality of turbine stages 12. As the steam impacts the plurality of rotor blades 38, it induces rotation of the rotating component 14 about the centerline axis 28. Thus, thermal energy of the steam 40 is converted to mechanical rotational energy by the plurality of turbine stages 12. The steam 40 exits the casing 16 at the low pressure steam exhaust 24. The steam 40 is then channeled to the boiler (not shown), where it is reheated, and/or to other components of the system, for example, a low pressure turbine section or a condenser (not shown).

Figure 2:
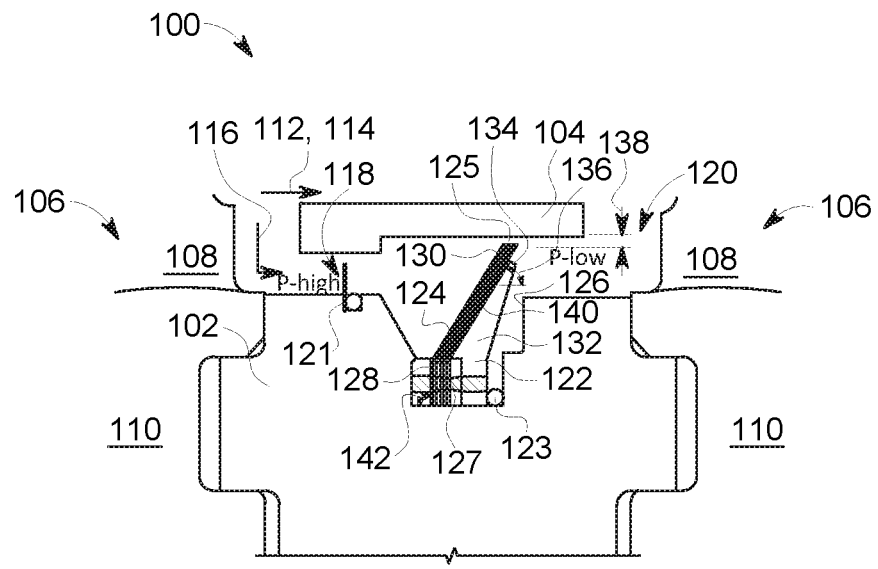
FIG. 2 is a schematic sectional view of an exemplary embodiment of a pressure activatable seal in a first operating state coupled to the exemplary rotary machine shown in FIG. 1, in accordance with one or more embodiments shown or described herein.
Figure 3:
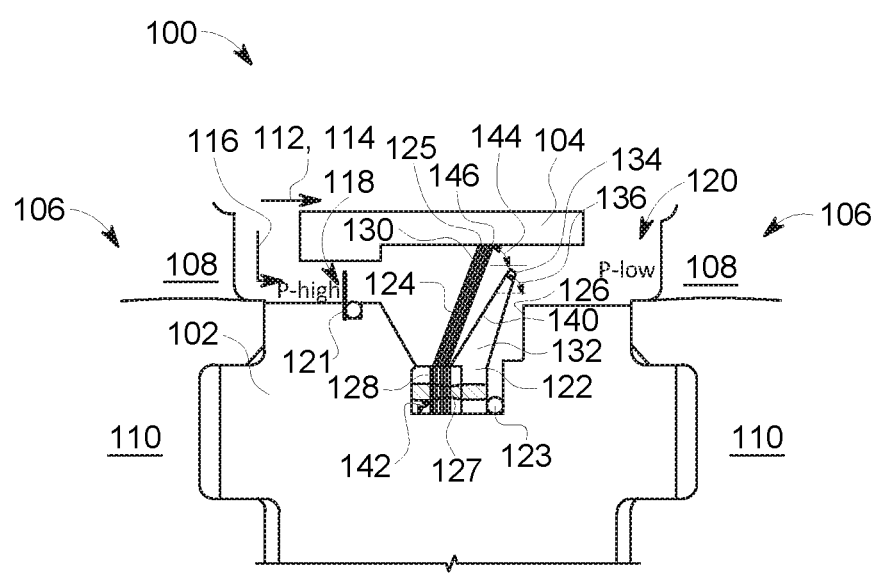
FIG. 3 is a schematic sectional view of the exemplary embodiment of the pressure activatable seal in a second operating state coupled to the exemplary rotary machine shown in FIG. 1, in accordance with one or more embodiments shown or described herein.

Turning to FIG. 2, illustrated is a schematic cross-sectional view of a centrifugally activatable seal 100 in a first operating state coupled to the exemplary rotary machine, according to embodiments disclosed herein. FIG. 3 illustrates in a schematic cross-sectional view the centrifugally activatable seal 100 of FIG. 2 in a second operating state coupled to the exemplary rotary machine. The seal 100 is used to form a dynamic seal between a rotating component 102, such as the rotating component 14 of FIG. 1 and a stationary component 104 in a turbomachine, such as the turbomachine 10 of FIG. 1.

In the exemplary embodiment of FIGS. 2 and 3, illustrated are a plurality of rotor blades 106, such as the plurality of rotor blades 38 of FIG. 1. Each of the plurality of rotor blades 106 includes an airfoil 108 and a root 110. Each of the roots 110 is coupled to the rotating component 102 in any suitable fashion, such that the plurality of rotor blades 106 rotate with the rotating component 102. In the exemplary embodiment, the stationary component 104 extends circumferentially about the rotating component 102. In an embodiment, but not by way of limitation, the stationary component 104 may comprise an inner ring of diaphragms coupled to a radially inner end of each partition, such as described with regard to FIG. 1, in any suitable fashion, such that the stationary component 104 is stationary with respect to rotating component 102. Alternatively, the stationary component 104 is any suitable stationary component of a rotary machine.

The rotor blade airfoils 108 and the stationary component 104 are disposed within a primary flow path 112, such as a primary flow path of steam 114. In addition, a leakage flow path 116 is defined generally between the stationary component 104 and the rotating component 102. The seal 100 is coupled to the rotating component 102 between the stationary component 104 and the rotating component 102, such that seal 100 rotates with the rotating component 102.

In the exemplary embodiment, the seal 100 includes a retaining plate 122 and a flexible element 124. Each of the retaining plate 122 and the flexible element 124 extends circumferentially about the rotating component 102. It is understood that the seal 100 typically forms a ring when installed in the turbomachine 10 (FIG. 1) and typically comprises a series of arcuate segments forming the complete ring when installed. In certain embodiments, the retaining plate 122 is formed from a plurality of arcuate segments that cooperate to form a substantially continuous ring around the rotating component 102. In some alternative embodiments, the retaining plate 122 extends circumferentially around less than an entirely of the rotating component 102. Moreover, in certain alternative embodiments, the retaining plate 122 is formed from a single arcuate segment.

The retaining plate 122 is coupled for rotation with the rotating component 102. For example, the retaining plate 122 is fixed to the rotating component 102 in any suitable fashion that enables the seal 100 to function as described herein. In the exemplary embodiment, the retaining plate 122 is positioned at least partially within a circumferentially extending groove 126 defined in the rotating component 102 between adjacent turbine stages, such as turbine stages 12 of FIG. 1. In alternative embodiments, the retaining plate 122 is positioned on the rotating component 102 in any suitable fashion that enables the seal 100 to function as described herein In certain embodiments, the flexible element 124 is formed from a plurality of arcuate segments that cooperate to form a substantially continuous ring around the rotating component 102. In some alternative embodiments, the flexible element 124 extends circumferentially around less than an entirely of the rotating component 102. Moreover, in certain alternative embodiments, the flexible element 124 is formed from a single arcuate segment.

The flexible element 124 extends generally radially outward from a first end 128 to an opposite free second end 130. The flexible element 124 is coupled, proximate the first end 128, for rotation with the rotating component 102. For example, the flexible element 124 is fixed to at least one of the rotating component 102 and the retaining plate 122 in any suitable fashion that enables the seal 100 to function as described herein. In the exemplary embodiment, the flexible element 124 is positioned adjacent to the retaining plate 122. More specifically, the flexible element 124 is positioned adjacent to, and upstream from, the retaining plate 122 and at least partially within the circumferentially extending groove 126. In alternative embodiments, the flexible element 124 is positioned in any suitable fashion that enables seal 100 to function as described herein. In the illustrated embodiment, the retaining plate 122 and the flexible element 124 can be attached to the circumferentially extending groove 126 through the use of caulks and welds. In the illustrated embodiment, the retaining plate 122 can be retained within the circumferentially extending groove 126 through the use of caulks and/or welds (e.g., caulk 123 and/or welds along faces of the retaining plate 122 that contact the circumferentially extending groove 126). An electron beam weld 127, as shown in FIGS. 2 and 3 is another example of how the flexible element 124 may be attached to the retaining plate 122.

As shown in FIGS. 2 and 3, additional seals can also be used in conjunction with the seal 100. For example, one or more tooth seals, such as J-strip seals 121, can be used. The J-strip seals 121 can have a fixed end attached to the rotating component 102 and a free end extending radially outward from the rotating component 102 toward the stationary component 104. The J-strip seals 121 can be positioned axially upstream and/or downstream of the seal 100.

In the exemplary embodiment, the flexible element 124 includes a plurality of brush bristles 125, such as, but not limited to, a variable diameter bristle pack. In alternative embodiments, the flexible element 124 includes a plurality of circumferentially spaced flexible fingers. In other alternative embodiments, the flexible element 124 includes at least one circumferentially extending thin plate. In some embodiments, the at least one thin plate is a plurality of thin plates. Further, in some embodiments, at least one of the thin plates circumferentially overlaps another of the thin plates. In still other alternative embodiments, the flexible element 124 includes any suitably flexible structure that enables the seal 100 to function as described herein.

In the illustrated embodiment of FIGS. 2 and 3, the pressure loading is from left to right, or from upstream to downstream, as indicated by "P-high" and "P-low", with the flexible element 124 facing a higher pressure side 118 of the seal 100, while the retaining plate 122 is exposed to a downstream low-pressure side 120 of the seal 100 with lower pressure. In such an arrangement, the pressure force acts to create pressure loading so as to press the flexible element 124 against the retaining plate 122, while a centrifugal force created during operation of the rotary machine 10 (FIG. 1) acts to force the flexible element 124 away from the retaining plate 122 and provide a dynamic seal against the stationary element 104, as described presently.

In the first operating state as best illustrated in FIG. 2, the retaining plate 122 at least partially supports, i.e., bears a partial load of, the flexible element 124. More particularly, the flexible element 124 is bent such that the opposite free second end 130 is axially displaced with respect to the fixed first end 128. The retaining plate 122 is similarly bent, such that the retaining plate 122 extends along at least a portion of the radial length of the flexible element 124. In the illustrated embodiment, the retaining plate extends along a substantial radial length of the flexible element 124. As illustrated, the retaining plate 122 extends at least partially along a radial length of the flexible element 124 such that, in the first operative state the retaining plate 122 supports the flexible element 124 from pressure loading, and more particularly when the flexible element is preloaded and pressed against the retaining plate 122. The retaining plate 122 is configured to extend between at least an intermediate portion 132 and a second end 134 of the retaining plate 122 at a first angle 136 with respect to the centerline axis 28 (FIG. 1). The first angle 136 is selected such that the free second end 130 of the flexible element 124 is separated from the stationary component 104 by a clearance gap 138. More specifically, in the exemplary embodiment, the first angle 136 is selected such that the clearance gap 138 produced by the pressure loading, when the rotating component operates below the critical speed, is sufficiently wide to reduce a breakaway torque required to start the rotary machine 10, and/or sufficiently wide to limit an interference with axial movement of the rotating component 102 relative to the stationary component 102.

In the exemplary embodiment, the retaining plate 122 includes a circumferentially extending stop face 140 configured to orient the flexible element 124 at the first angle 136 proximate the retaining plate 124 while the rotating component 102 is operating at less than the critical speed and under pressure loading.

More specifically, the stop face 140 is positioned such that, in the first operating state, the flexible element 124 is positioned proximate the retaining plate 122. In the first operating state, the pressure loading causes the flexible element 124 to couple against the stop face 140. The stop face 140 at least partially, supporting the flexible element 124. Thus, the stop face 140 is configured to retain the flexible element 124 at the first angle 136 proximate in the first operating state. The stop face 140 thus provides a consistent positioning of flexible element 124 relative to the stationary component while the rotating component 102 is operating at less than the critical speed and when under pressure loading. For example, but not by way of limitation, the stop face 140 presents a rigid, circumferentially extending tip that intercepts the flexible element 124 as the flexible element 124 rotates radially inward when under pressure loading. In alternative embodiments, the seal 100 includes any other suitable structure configured to orient the flexible element 124 proximate the retaining plate 122 at the first angle 136 while the rotating component 102 is operating at less than the critical speed and when under pressure loading conditions.

As previously described, in the exemplary embodiment, the retaining plate 122 includes the stop face 140 configured to orient the flexible element 124 at the first angle 136. More specifically, the first end 128 of the flexible element 124 extends from the rotating element 102 at a base angle 142, and the flexible element 124 is configured to couple against the stop face 140 of the retaining plate 122 under pressure loading such that the flexible element 124 bends to the first angle 136. For example, but not by way of limitation, the base angle 142 is 90 degrees, and the stop face 140 defines a rigid, circumferentially extending face disposed at the first angle 136 with respect to the centerline axis 28.

In the second operating state as best illustrated in FIG. 3, the flexible element 124 extends proximate the free second end 130 at a second angle 144 with respect to the centerline axis 28 (FIG. 1). The second angle 144 is selected such that clearance gap 138 (FIG. 2) between the second free end 130 and the stationary component 104 is reduced or eliminated during centrifugal loading. More specifically, in the exemplary embodiment, the second angle 144 is selected such that the flexible element 124 forms a dynamic seal 146 between the rotating component 102 and the stationary component 104 during centrifugal loading, such as during operation equal to or above the critical speed.

Thus, in certain embodiments, the selected stiffness of flexible element 124 facilitates centrifugal activation of seal 100 when the rotating component 102 reaches speeds greater than the critical speed. Moreover, an operating speed greater than the critical speed causes seal 100 to centrifugally activate despite the relatively higher pressure of steam 40 upstream from the seal 100, which tends to counteract the centrifugal force on the flexible element 124 induced by rotation of rotating component 102.

Moreover, in the exemplary embodiment, the flexible element 124 has a stiffness sufficient to orient the free second end 130 at the first angle 136 when the rotating component 102 is operating at equal to or less than a critical speed. Moreover, the stiffness of flexible element 124 is overcome by a centrifugal force induced by the rotating component 102 when an operating speed is greater than the critical speed, such that an angle at which second end 130 extends, increases beyond the first angle 136. As previously stated, the critical speed is defined as the rotational speed at which the stiffness of the flexible element 124 is overcome by the centrifugal force induced by the rotation of the rotating component 102 about the centerline axis 28 (FIG. 1), causing the angle at which second end 130 extends to increase beyond the first angle 136. In addition, the pressure force acting upon the flexible element 124 may influence the critical speed. It should be understood that the rotating component 102 operating at less than the critical speed includes the rotating component 102 being stopped, that is, rotating at zero speed. Thus, in certain embodiments, the stiffness of flexible element 124 facilitates maintaining clearance gap 138 during start-up operation of the rotating component 102, until the rotating component 102 is at an operating speed that is greater than the critical speed.

In an alternate embodiment, as best illustrated in FIG. 4, during the second operating state, the flexible element 124 extends proximate the free second end 130 at a second angle 144 with respect to the centerline axis 28 (FIG. 1), as previously described. In contrast to the previous embodiment, in the embodiment of FIG. 4, during operation at speeds above the critical speed, the second angle 144 of the flexible element 124 will continue to increase as the speed increases. Accordingly, to act as a "stop" for the flexible element 124 during this second state of operation, in the exemplary embodiment of FIG. 4, a circumferentially extending second stop face 150 is disposed so as to orient the flexible element 124 at the second angle 144 when the rotating component 102 is operating at a speed greater than the critical speed. For example, but not by way of limitation, the second stop face 150 presents a rigid, circumferentially extending tip that intercepts the flexible element 124 as the flexible element 124 rotates radially outward during the second state of operation. In alternative embodiments, the seal 100 includes any other suitable structure configured to orient the flexible element 124 at the second angle 144 while the rotating component 102 is operating at speeds greater than the critical speed.

More specifically, the second stop face 150 is positioned such that, in the first operating state, the flexible element 124 is positioned proximate the retaining plate 122. In the first operating state, the pressure loading causes the flexible element 124 to couple against the stop face 140, also referred to as a first stop face 140. Thus, the stop face 140 is configured to retain the flexible element 124 at the first angle 136 proximate in the first operating state. The stop face 140 thus provides a consistent positioning of flexible element 124 relative to the stationary component while the rotating component 102 is operating at less than the critical speed and when under pressure loading. In the second operating state as illustrated in FIG. 4, the operating speed causes the second angle 144 of the flexible element 124 to continually increase as the speed increases. The second stop face 150 serves as a "stop" for the flexible elements during this state of operation and orients the flexible element 124 at the second angle 144 when the rotating component 102 is operating at a speed greater than the critical speed. Similar to the first stop face 140, the second stop face 150 at least partially supports the flexible element 124 during this second state of operation. Thus, the second stop face 150 is configured to retain the flexible element 124 at the second angle 144 in the second operating state. Similar to the previously described embodiment, the second angle 144 is selected such that clearance gap 138 (FIG. 2) between the second free end 130 and the stationary component 104 is reduced or eliminated during centrifugal loading. More specifically, in the exemplary embodiment, the second angle 144 is selected such that the flexible element 124 forms a dynamic seal 146 between the rotating component 102 and the stationary component 104 during centrifugal loading, such as during operation above the critical speed. The stop face 150 thus provides a consistent positioning of flexible element 124 relative to the stationary component while the rotating component 102 is operating at speeds greater than the critical speed.

An exemplary method 200 of assembling a seal, such as seal 100, of a rotary machine, such as rotary machine 10, is illustrated in the flow diagram of FIG. 5. With reference also to FIGS. 1-4, in the exemplary embodiment, the method 200 includes coupling 202 a flexible element, such as flexible element 124, to a rotating component, such as the rotating component 102, of the rotary machine 10. The flexible element extends circumferentially about the rotating component and extends generally radially from a first end, such as first end 128, to an opposite, free second end, such as second end 130. The flexible element is coupled proximate the first end for rotation with the rotating component. In the exemplary embodiment, the method 200 further includes coupling 204 a retaining plate, such as retaining plate 122, to the rotating component adjacent to the flexible element for rotation with the rotating component. The retaining plate includes a stop face, such as stop face 140, configured to orient the flexible element at a first angle, such as first angle 136, proximate the retaining plate 122 when under pressure loading and when the rotating component is operating at less than the critical speed, such that a clearance gap, such as clearance gap 138, is defined between the free second end and a stationary component, such as the stationary component 104, of the rotary machine.

The flexible element is configured to extend at substantially a second angle, such as second angle 144, when the rotating component operating at a speed greater than a critical speed, such that the flexible element forms a dynamic seal, such as dynamic seal 146, between the rotating component and the stationary component.

Exemplary embodiments of a centrifugally activatable seal for a rotary machine, and method of assembling the seal, are described above in detail. The embodiments provide advantages over known seals in which the pressure and centrifugal force both push a flexible element, such as brush bristles, against a backing plate creating a stiff seal. The proposed design is also advantageous over a design in which pressure pushes the bristles away from backing plate and centrifugal force pushes the bristles towards the backing plate. In addition, because the flexible element of the disclosed design is rubbing against the stationary component to provide sealing, it avoids the problems commonly seen with traditional brush seals, where the flexible element rubs against the rotating component, regarding excessive heating of the rotating component at a localized spot due to frictional heating.

As described herein, when the rotating component is operating below a critical speed, the seal provides a clearance gap between a flexible element of the seal and a stationary component of the rotary machine. The clearance gap is sufficiently wide to reduce a breakaway torque required to start the rotary machine, and/or sufficiently wide to limit an interference with axial movement of the rotating component relative to the stationary component during start-up. The embodiments provide further advantages in that a stiffness of the flexible element is overcome by a centrifugal force induced by the rotating component operating at or above the critical speed, such that the flexible element rotates outward and the clearance gap is reduced or eliminated, forming a dynamic seal between the rotating component and the stationary component. By designing the seal such that the centrifugal force and pressure differential oppose each other, the effective stiffness of the flexible element can be reduced significantly. The reduced stiffness of the flexible element can lead to lower wear of the seal, leading to lower degradation in leakage performance over the life of the seal. A seal that wears out less will provide better leakage performance over its life. In addition, lower leakage in parasitic flow results in higher efficiency and fuel savings in turbomachinery.

The embodiments provide further advantages in that a retaining plate of the seal stops the flexible element at a selected angle when the rotating component is operating below the critical speed, but subject to pressure loading. Accordingly, in light of pressure loading, the seal is always loaded against the backing plate when the rotating component is operating at less than a critical speed, resulting in a design that is more robust in leakage.

The centrifugally activatable seal and methods described above are not limited to the specific embodiments described herein, but rather, components of the apparatus and/or steps of the methods may be utilized independently and separately from other components and/or steps described herein. For example, the exemplary embodiments can be implemented and utilized in connection with many other rotary machines.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. This written description uses examples to disclose the disclosure, including the best mode, and also to enable any person skilled in the art to practice the disclosure, including making and using any devices or systems and performing any incorporated methods. The representative examples and embodiments provided herein include features that may be combined with one another and with the features of other disclosed embodiments or examples to form additional embodiments that are still within the scope of the present disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seal, the seal comprising:
   a flexible element extending circumferentially about a rotating component of a rotary machine and extending generally radially from a first end to an opposite, free second end, the flexible element coupled proximate the first end for rotation with the rotating component about a centerline axis; and
   a retaining plate coupled adjacent the flexible element for rotation with the rotating component, the retaining plate comprising a first stop face extending generally radially from a first end to an opposite second end, the first stop face orienting the flexible element at a first acute angle with respect to the centerline axis and a flow in a downstream direction, such that the flexible element is coupled against the first stop face when the rotating component is operating at less than a critical speed and under the influence of pressure loading, such that a clearance gap is defined between the flexible element and a stationary component of the rotary machine; and
   wherein the flexible element faces a high-pressure side of the seal, and the retaining plate is exposed to a downstream, low-pressure side of the seal,
   a second stop face extending generally radially from a first end to an opposite second end, wherein the first stop face extends radially a distance greater than the second stop face, the second stop face coupled adjacent the flexible element for rotation with the rotating component, the second stop face orienting the flexible element at substantially a second acute angle with respect to the centerline axis and the flow in the downstream direction different than the first acute angle, such that the flexible element is coupled against the second stop face when the rotating component is operating at a speed greater than the critical speed, such that a dynamic seal is defined between the rotating component and the stationary component of the rotary machine.

2. The seal of claim 1, wherein the flexible element comprises a stiffness sufficient to orient the flexible element at the first acute angle when the rotating component is operating at less than the critical speed, and wherein the stiffness is overcome by a centrifugal force induced by the rotating component operating at a speed greater than the critical speed, such that the second acute angle at which the flexible element extends increases beyond the first acute angle.

3. The seal of claim 1, wherein the first acute angle is less than the second acute angle.

4. The seal of claim 1, wherein the flexible element comprises a plurality of brush bristles.

5. The seal of claim 1, wherein the flexible element comprises at least one of a plurality of circumferentially spaced flexible fingers and a circumferentially extending thin plate.

6. The seal of claim 1, wherein the first stop face defines a rigid, circumferentially extending face disposed at the first acute angle.

7. A rotary machine comprising:
   a rotating component rotatable about a centerline axis;
   a stationary component that extends circumferentially about the rotating component;
   a flexible element extending circumferentially about the rotating component of the rotary machine and extending generally radially from a first end to an opposite, free second end, the flexible element coupled proximate the first end for rotation with the rotating component; and
   a retaining plate coupled adjacent the flexible element for rotation with the rotating component about the centerline axis, the retaining plate comprising a first stop face extending generally radially from a first end to an opposite second end, the first stop face orienting the flexible element at a first acute angle with respect to the centerline axis and a flow in a downstream direction, such that the flexible element is coupled against the first stop face when the rotating component is operating at less than a critical speed and under the influence of pressure loading, such that a clearance gap is defined between the flexible element and a stationary component of the rotary machine; and
   a second stop face extending generally radially from a first end to an opposite second end, wherein the first stop face extends radially a distance greater than the second stop face, the second stop face coupled adjacent the flexible element for rotation with the rotating component, the second stop face orienting the flexible element at substantially a second acute angle with respect to the centerline axis and the flow in a downstream direction different than the first acute angle, such that the flexible element is coupled against the second stop face when the rotating component is operating at a speed greater than the critical speed, such that a dynamic seal is defined between the rotating component and the stationary component of the rotary machine.

8. The rotary machine of claim 7, wherein the flexible element comprises a plurality of brush bristles.

9. The rotary machine of claim 7, wherein the flexible element comprises at least one of a plurality of circumferentially spaced flexible fingers and a circumferentially extending thin plate.

10. The rotary machine of claim 7, wherein the flexible element comprises a stiffness sufficient to orient the flexible element at the first acute angle when the rotating component is operating at less than the critical speed, and wherein the stiffness is overcome by a centrifugal force induced by the rotating component operating greater than the critical speed, such that an angle at which the flexible element extends increases beyond the first acute angle.

11. The rotary machine of claim 7, wherein the first stop face defines a rigid, circumferentially extending face disposed at the first acute angle.

12. The rotary machine of claim 7, wherein the first acute angle is less than the second acute angle.

13. The rotary machine of claim 7, wherein the stationary part comprises an inner ring of a diaphragm of the rotary machine.

14. The rotary machine of claim 7, wherein the flexible element is positioned upstream from the retaining plate.

15. The rotary machine of claim 7, wherein the flexible element faces a high-pressure side of the seal, and the retaining plate is exposed to a downstream, low-pressure side of the seal.

16. A method for assembling a seal of a rotary machine, the method comprising:
   coupling a flexible element to a rotating component proximate a first end of the flexible element, wherein the rotating component is rotatable about a centerline axis, the flexible element extending at a second acute angle with respect to the centerline axis and a flow in a downstream direction when the rotating component is operating at a speed greater than a critical speed, such that the flexible element forms a dynamic seal between the rotating component and the stationary component;

coupling a retaining plate adjacent the flexible element, the retaining plate including a first stop face extending generally radially from a first end to an opposite second end, the first stop face orienting the flexible element at a first acute angle with respect to the centerline axis and the flow in a downstream direction, such that the flexible element is coupled against the first stop face when the rotating component is operating at a speed less than the critical speed and under the influence of pressure loading such that a clearance gap is defined between the flexible element and the stationary component; and coupling a second stop face extending generally radially from a first end to an opposite second end, wherein the first stop face extends radially a distance greater than the second stop face, the second stop face coupled adjacent the flexible element for rotation with the rotating component, the second stop face orienting the flexible element at the second acute angle, such that the flexible element is coupled against the second stop face when the rotating component is operating at a speed greater than the critical speed.

17. The method of claim 16, wherein the first stop face defines a rigid, circumferentially extending face disposed at the first acute angle.

18. The method of claim 16, wherein the flexible element comprises a plurality of brush bristles.

19. The method of claim 16, wherein the flexible element faces a high-pressure side of the seal, and the retaining plate is exposed to a downstream, low-pressure side of the seal.

* * * * *